Aug. 14, 1951 J. B. MAGGIO 2,564,017

CLAMP CIRCUIT

Filed June 4, 1949

INVENTOR
J. B. MAGGIO
BY
H. O. Wright
ATTORNEY

Patented Aug. 14, 1951

2,564,017

UNITED STATES PATENT OFFICE 2,564,017

CLAMP CIRCUIT

John B. Maggio, Summit, N. J., assignor to Bell Telephone Laboratories, Incorporated, New York, N. Y., a corporation of New York Application June 4, 1949, Serial No. 97,170

14 Claims. (Cl. 178—7.3)

This invention relates to improved electronic circuits of the class designated by those skilled in the art as "clamping" or "direct-current reinsertion" circuits. More particularly, it relates to an improved compound type of clamping circuit in which a plurality of clamping circuit arrangements are operated concurrently whereby a like plurality of appropriately selected points in the over-all circuit can each be "clamped" to their own respective particular desired voltage levels which respective levels can be chosen virtually independently with respect to the voltage level at which any of the other of said plurality of points is to be clamped. A feature of the circuits of the invention is the introduction of "preliminary clamping" as will be described in detail below.

The disclosure of the copending application Serial No. 72,927 filed January 26, 1929, in the name of S. Doba, Jr., assignor to applicant's assignee, may be referred to for a general discussion of representative prior art "clamping" or "direct-current reinsertion" circuits.

The primary object of the invention is to provide an improved circuit of the type designated by those skilled in the art as a "clamping" or "direct-current reinsertion" circuit.

Another object is to provide "clamping" circuits in which several points of a complex circuit can be "clamped," each to a different voltage level.

A further object is to provide a "clamping" circuit which affords a plurality of different "clamping" voltages at a like plurality of different points in a complex circuit, the values of which clamping voltages can each be independently adjusted without reaction upon the effective "clamping" voltage at any other "clamping" point in the complex circuit.

A still further object is to provide "clamping" circuits in which the current drain on the "clamping voltage" source is very small.

Other objects will become apparent during the course of the detailed description of specific illustrative circuits of the invention given below.

Figure 1:
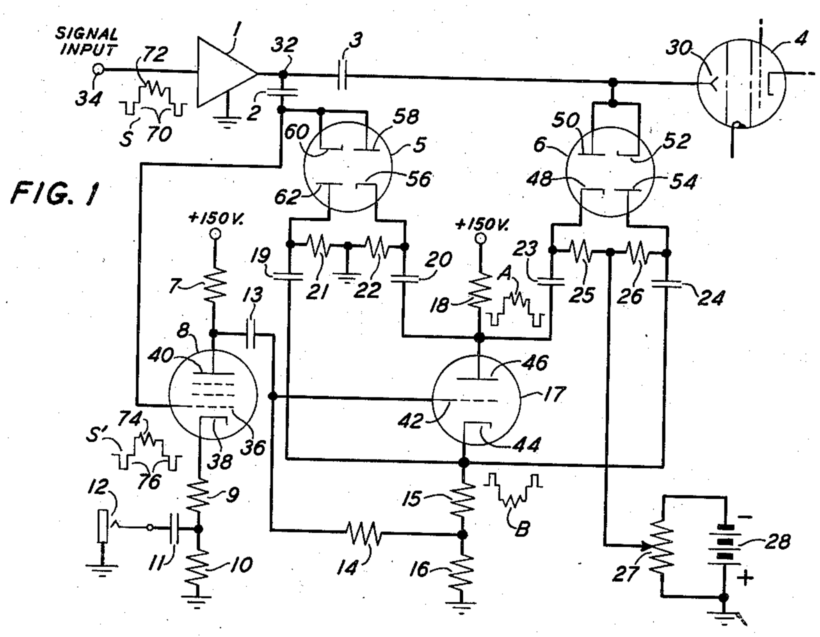
Figure 2:
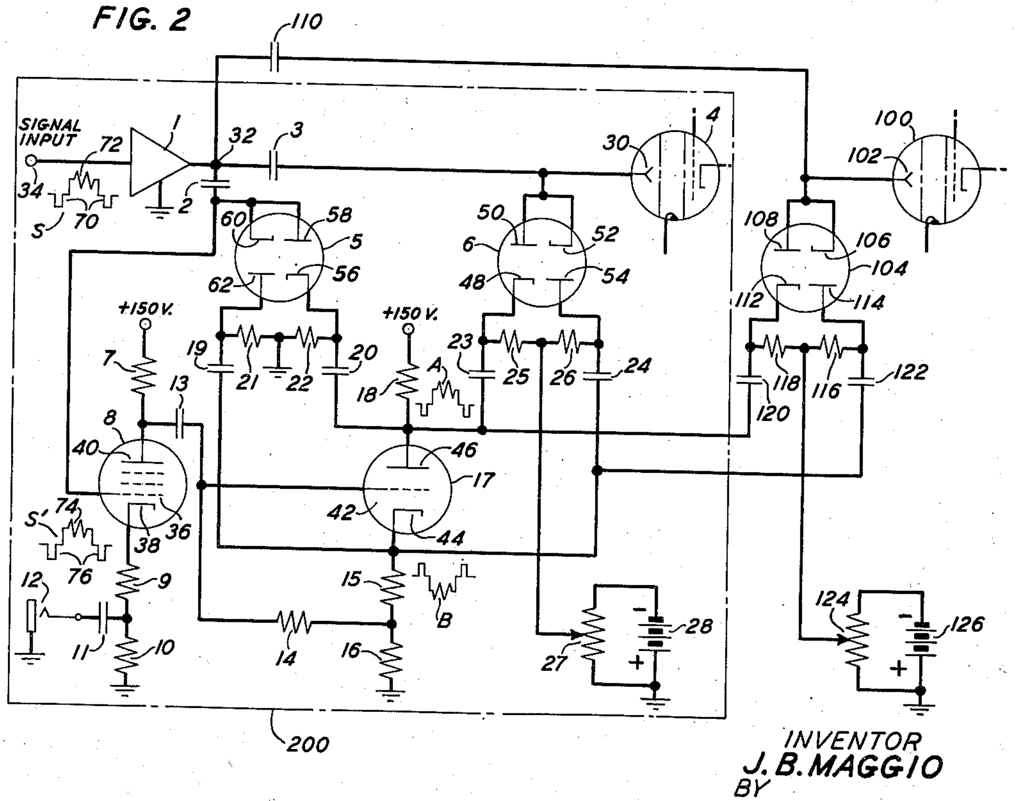

The nature of and the principles underlying the invention will be more readily understood from the following detailed description of illustrative circuits taken with the accompanying drawings in which:

Fig. 1 is an electrical schematic diagram of a preferred specific form of circuit of the invention providing for "clamping" or "direct-current reinsertion" at two points in a complex circuit; and Fig. 2 is an electrical schematic diagram of a second preferred specific form of circuit of an invention providing for "clamping" or "direct-current reinsertion" at three points in a complex circuit.

In more detail, in Fig. 1 the amplifier 1 can be, for example, a conventional video amplifier employed to amplify a television signal applied to its input terminal 34. The signal may have, for instance, approximately the wave form indicated crudely by the signal S shown below terminal 24. Amplifier 1 can be, for example, a conventional feedback broad band type of amplifier having a substantially uniform gain over the frequency region extending between virtually direct current and approximately four (4) megacycles, or more.

At junction point 32 two circuits are connected electrically to the output of amplifier 1.

One of these circuits connects through condenser 3 to the repeller anode 30 of reflex Klystron vacuum tube 4, which functions as an oscillator, the frequency of which is dependent upon the voltage applied to its repeller. The reflex Klystron oscillator is described, for example, in the book entitled "Radio Engineering" by F. E. Terman, published in 1947 by McGraw-Hill Book Company, Incorporated, New York city, pages 442 to 451, inclusive.

The second of these circuits connects through condenser 2 to the control electrode 36 of conventional pentode vacuum tube 8 arranged to function as an amplifier (see page 169 of Terman's "Radio Engineering" cited above). The signal from amplifier 1 is thus applied to the control electrode 36 of vacuum tube 8 and the repeller 30 of vacuum tube 4. It may, however, as will be described in detail presently, be modified in character by the action of the clamper circuit of the invention comprising in one specific form the vacuum tubes 5, 6, 8 and 17 and the wiring and apparatus units directly associated with these four tubes. The input television signal S shown in Fig. 1 includes the synchronizing pulses 70 which are repeated at regular intervals and are employed in synchronizing the scanning action of the television receiving apparatus with that of the transmitting apparatus as is well known to those skilled in the art. As shown in Fig. 1, these pulses may be negative and should be of substantially constant amplitude. The portion of the television signal between successive synchronizing pulses represents the picture content. This signal is of opposite polarity with respect to the synchronizing pulses and is subject to wide variations depending upon the instant character of the picture being transmitted.

The primary function of "clamping" or "direct-current reinsertion" or "restoration" circuits in television receivers, as is well understood in the art, is to stabilize or keep at a substantially constant reference voltage level the recurring synchronizing pulses. The level of these pulses tends to drift (unless clamped) in substantially all practicable forms of television systems because of unavoidable distributed capacities throughout the circuits and the less than ideal performance characteristics of the transformers, retardation coils and other apparatus units normally employed.

The input television signal is amplified without inversion in amplifier 1 and thus appears as a similar signal S′ at control electrode 36 of pentode amplifying tube 8, the signal S′, including synchronizing pulses 76 and intervening television picture signal 74.

Pentode 8 is normally conducting and anode-cathode circuit current flowing through resistors 9 and 10, connected between the cathode 38 and ground, develops an appropriate bias voltage difference between cathode 38 and control electrode 36. By means of capacity 11, connecting jack 12 to the junction of resistors 9 and 10, a suitable portion of the cathode circuit voltage is made readily available for the purpose of monitoring the operation of the clamping circuit. Resistor 7 in the anode circuit of vacuum tube 8 provides an appropriate load impedance for the tube.

The terminal at the upper end of resistor 7 is connected, for normal operation of the circuit, to the positive terminal of a source of 150 volts direct current, the negative terminal of the source being connected to ground.

The output of vacuum tube 8 is transmitted through condenser 13 to the control electrode 42 of vacuum tube triode phase inverter 17.

The sum of the resistance values of resistors 15 and 16 in the cathode circuit of tube 17 is made equal to the value of resistance of the anode load resistor 18. Equal signals of opposite phases, illustrated by signals A and B of Fig. 1, are, therefore, obtained at the anode 46 and the cathode 44, respectively. "Grid bias" is provided by the voltage drop in cathode resistor 15 and is applied to control electrode 42 through the "grid leak" resistor 14.

The terminal at the upper end of resistor 18 is also connected to the positive terminal of a source of 150 volts direct current, the negative terminal of the source being connected to ground.

The balanced signals A and B, described above, are applied to a pair of twin diode vacuum tubes 5 and 6, as shown.

Twin (or double) diode tube 5 clamps the signal which is applied to the input of clamping amplifier 8. Capacitors 19 and 20 are inserted in the leads from cathode 44 and anode 46, respectively, of vacuum tube 17 to isolate anode 62 and cathode 56, respectively, of vacuum tube 5 from direct-current voltages present in the circuit of vacuum tube 17.

Resistors 21 and 22 are bridges across the leads to anode 62 and cathode 56 of vacuum tube 5, as shown, and their junction point is grounded, as it is desired in the illustrative circuit of Fig. 1 to "clamp" the lower terminal of capacitor 2 to substantially ground potential during the synchronizing pulses 70 of input signal S. Cathode 60 and anode 58 of vacuum tube 5 are connected together and to the lower terminal of capacitor 2, as shown.

The combination of vacuum tubes 8, 17 and 5 and the circuits immediately associated therewith, comprises a "clamping" circuit somewhat similar to one disclosed and described in detail in the above-mentioned application of S. Doba.

Since any low frequency distortion or drift permitted to remain in the clamping signals A and B will appear in the output signal, it is, obviously, advantageous to remove such distortion. The clamping action at the control grid 36 of tube 8 clearly accomplishes this by using the clamped output of tube 5 which is free of such distortion as a source of clamping signals. For the purposes of this application the circuit which effects this preliminary elimination of distortion from the clamping signals, namely, the circuit including vacuum tubes 8, 17 and 5, arranged and connected as described in detail above, will be referred to as a "preliminary clamping" circuit.

In the circuits of the present invention the same balanced clamping signals which are employed as described in detail above, to clamp the control electrode 36 of vacuum tube 8 are also used in clamping the repeller electrode 30 of the reflex Klystron 4 by means of the second twin diode vacuum tube 6 and its associated circuits.

As shown in Fig. 1 the clamping signals A and B are applied to cathode 48 and anode 54, respectively, of vacuum tube 6, coupling condensers 23 and 24 being interposed in the leads carrying signals A and B, respectively, to isolate twin diode vacuum tube 6 from direct-current potentials present in the circuits of vacuum tube 17.

Resistors 25 and 26 are bridged across the cathode 48 and the anode 54 of vacuum tube 6 as shown in Fig. 1 and their junction point is connected to the movable contacting member of potentiometer 27, as shown.

Potentiometer 27 is, in turn, connected across a source of direct-current potential 28, one terminal common to the potentiometer and the potential supply being grounded, as shown. The positive terminal of source 28 is grounded. Anode 50 and cathode 52 of vacuum tube 6 are connected together and to the right-hand terminal of capacitor 3, as shown.

The circuit arrangement just described obviously permits repeller 30 to reflex Klystron vacuum tube 4 to be clamped, during the synchronizing pulses 70 (or 76) to any potential selected by adjustment of the position of the movable contacting member of potentiometer 27. The selection of this potential is obviously independent of the selection of the clamping potential chosen for the preliminary clamping circuit which includes twin diode vacuum tube 5.

The circuit shown in Fig. 1 will be readily recognized by those skilled in the art as adapted to convert the amplitude-modulated input signal into a frequency-modulated signal in the output of the reflex Klystron oscillator tube. As stated in Terman's "Radio Engineering" mentioned above, this is one of the principal uses of the reflex Klystron oscillator.

A further application of the principles of the invention is illustrated in Fig. 2 in which an additional clamping circuit comprising twin diode vacuum tube 104 and its associated circuits has been added to the circuit shown in Fig. 1. The dash-dot line 200 encloses that portion of Fig. 2 which is reproduced from Fig. 1. Line 200 has been inserted in Fig. 2 to facilitate comparison of the two figures. The additional clamping circuit of Fig. 2 is employed, as shown, to clamp an additional reflex Klystron oscillator 100.

Like elements of Figs. 1 and 2 bear the same designation numbers in both figures and the detailed description of the elements and of the circuits of Fig. 1 given above is directly applicable to the like designated elements and the corresponding portions of the circuits of Fig. 2, respectively.

The additional clamping circuit shown in Fig. 2 comprises, as mentioned above, the twin diode vacuum tube 104 and its associated circuits. Cathode 112 and anode 114 are coupled by capacitors 120 and 122 to the anode 46 and the cathode 44, respectively, of triode vacuum tube 17. Capacitors 120 and 122, of course, isolate vacuum tube 104 from direct-current potentials existing in the circuits of vacuum tube 17. Resistors 118 and 116 are bridges across cathode 112 and anode 114, as shown, and their junction point is connected to the movable contacting member of potentiometer 124.

Potentiometer 124 is in turn connected across a direct-current voltage source 126 and a common terminal of potentiometer 124 and source 126 is grounded. The positive terminal of source 126 is grounded.

Cathode 106 and anode 108 are connected together and to the right terminal of capacitor 110, the left terminal of which is connected to the output of amplifier 1. The right terminal of capacitor 110 is also connected to the repeller 102 of a second reflex Klystron oscillator tube 100.

Obviously, the clamping voltage and thus the frequency of oscillator tube 100, during the clamping pulses, can be determined by adjustment of the movable contacting member of potentiometer 124.

The voltage range available across the potentiometers of both source 28 and source 126 can be made sufficienty great that either or both of the potentiometers 27 and 124 can be adjusted to a value such that the associated Klystron 4, or 100, respectively, will not oscillate.

By way of specific example, the potentiometers can provide normal operating voltages within the range of minus 200 to minus 300 volts and to disable either Klystron, its associated potentiometer can be adjusted so that a voltage of approximately minus 5 volts is applied at the junction of the associated resistors 25, 26 or 118, 116, respectively.

This feature provides a convenient way of cutting off transmission through to the output circuit of either Klystron (no output circuits shown).

It is obvious that with the circuit arrangement illustrated by Fig. 2 a plurality of channels, which can be adjusted to different frequencies, can be simultaneously supplied with the signal from amplifier 1, the clamping of all of such channels being controlled by the preliminary clamping circuit comprising vacuum tubes 8, 17 and 5. Such a circuit is valuable, for example, in an over-all radio relay system in which a particular television program is to be transmitted from a single transmitting station to several receiving stations, a different frequency channel or band being employed for transmission to each receiving station.

The arrangement of Fig. 2 is also conveniently adaptable to systems in which alternate or stand-by channels, which can be rapidly and conveniently substituted one for the other, are desired so that a breakdown in one channel will not cause a protracted shutdown of the over-all system.

A further distinct advantage of the circuits of Figs. 1 and 2 results from the fact that the only current drain on the reference or clamping voltage sources 28 and 126 is that resulting from the bridging of the potentiometer across the source in each instance. Obviously, by making the total resistance of the potentiometer large the current drain can be reduced to a very small value.

Numerous modifications and rearrangements of the illustrative circuits of Figs. 1 and 2 can readily be made by those skilled in the art, without departing from the spirit and scope of the invention.

What is claimed is:

1. An electrical circuit which includes a source of signals comprising a series of recurring pulses of approximately uniform amplitude and of one polarity separated by intervening signals of widely varying amplitude and of the opposite polarity from said pulses, a vacuum tube amplifier, a capacitor coupling the input circuit of said amplifier to said source of signals, a first clamping circuit driven by said amplifier and connected to clamp the input circuit of said amplifier to a predetermined potential in response to each of said amplified recurrent pulses, a reflex Klystron oscillator the repeller electrode of which is connected by a second capacitor to said source of signals, a second clamping circuit connected between the output of said amplifier and the repeller electrode of said Klystron oscillator and responsive to each of said amplified recurrent pulses to clamp said repeller electrode circuit to a second predetermined voltage level.

2. The arrangement defined in claim 1 and means for independently adjusting the voltage to which said second clamping circuit clamps said repeller electrode.

3. The arrangement defined in claim 1 and means for independently adjusting the voltage to which said second clamping circuit clamps said repeller electrode, said voltage adjusting means having a range sufficient to clamp said repeller electrode to a voltage at which oscillation of said reflex Klystron oscillator will be inhibited.

4. An electrical circuit which includes a source of signals, said signals comprising a series of recurring pulses of approximately uniform amplitude and of one polarity separated by intervening signals of widely varying amplitude and of the opposite polarity from said pulses, a vacuum tube amplifier, a capacitor coupling the input circuit of said amplifier to said source of signals, a first clamping circuit driven by said amplifier and connected to clamp the input circuit of said amplifier to a predetermined potential in response to each of said amplified recurrent pulses, first and second reflex Klystron oscillators the repeller electrodes of which are coupled by second and third capacitors respectively to said source of signals and second and third clamping circuits connected between said amplifier and the repeller electrodes of said first and second reflex Klystron oscillators, respectively, said second and third clamping circuits being responsive to each of said amplified recurrent pulses to clamp their respective repeller electrodes to a second and a third predetermined voltage level, respectively.

5. The arrangement defined in claim 4 and independent means for adjusting each of the predetermined voltage levels to which said repeller electrodes are clamped, respectively.

6. The arrangement defined in claim 4 and independent means for adjusting each of the predetermined voltage levels to which said repeller electrodes are clamped, respectively, said independent means for adjusting each of the predetermined voltage levels to which said repeller electrodes are clamped, each having a range sufficient to clamp its associated repeller electrode to a voltage at which oscillation of its associated reflex Klystron oscillator will be inhibited.

7. In a circuit for the transmission of a composite signal consisting of recurrent pulses of one polarity with intervening signals of the opposite polarity, a source of said signal, a utilizing circuit for said signal, a first capacitor, a second capacitor, a vacuum tube amplifier comprising an amplifying stage and a balanced phase inverter stage, first and second clamping stages each comprising a pair of oppositely poled diodes, the cathode of one diode and the anode of the other diode being connected to the anode and cathode, respectively, of the vacuum tube comprising said balanced phase inverter stage, the remaining elements of each pair of said diodes being connected together to constitute the output terminals of their respective clamping circuits, said first capacitor coupling the input of said amplifier stage to said source of signal, said phase inverter stage being connected to the output of said amplifying stage, both said clamping stages being connected in parallel to the output of said phase inverter stage, said second capacitor coupling said source of signal to said utiliziing circuit for said signal, the output of said first clamping stage being connected to the input of said amplifying stage and the output of said second clamping stage being connected to the input of said utilizing circuit.

8. The combination of claim 7 and a third capacitor, a third clamping stage comprising a third pair of oppositely poled diodes, connected in the same way as said first and said second pairs of diodes, and a second utilization circuit for said signal, said third capacitor coupling said second utilization circuit to said source of signal, said third clamping circuit being connected between the output of said phase inverter stage and the input of said second utilization circuit.

9. The combination of claim 7 in which said second clamping stage includes an independent source of clamping or reference voltage.

10. The combination of claim 7 and an independent source of clamping or reference voltage for said second clamping stage, said last-mentioned source including means for adjusting the effective clamping or reference voltage over a wide range including values which are sufficient to incapacitate the associated utilizing circuit.

11. In a circuit for the transmission of a composite signal consisting of recurrent pulses, all of said pulses having approximately a first predetermined average amplitude with intervening signals having a substantially different second predetermined average amplitude, a source of said composite signal, a utilization circuit for said composite signal electrically connected to said source, a control circuit connected to said source, said control circuit comprising an amplifying circuit and two clamping circuits, the output of said amplifying circuit being electrically connected to the input circuits of said two clamping circuits, both of said clamping circuits being responsive to the said recurrent pulse portion of said composite signal appearing in the output of said amplifying circuit, the output of one of said clamping circuits being electrically connected to clamp the input of said amplifying circuit, the output of the other of said clamping circuit being electrically connected to clamp the input of said utilization circuit.

12. The arrangement of claim 11 in which the last-mentioned clamping circuit includes means for independently adjusting the voltage to which said circuit clamps the input of said utilization circuit.

13. The combination of claim 11 and a second utilization circuit electrically connected to said source of signals and a third clamping circuit electrically interconnected between the output of the said amplifying circuit and the input of the said second utilization circuit.

14. In a circuit for the transmission of a composite signal consisting of recurrent pulses, all of said pulses having approximately a first predetermined average amplitude with intervening signals having a substantially different second predetermined average amplitude, a source of said composite signal, a plurality of utilization circuits for said signal electrically connected to said source, a control circuit connected to said source, said control circuit comprising an amplifying circuit and a plurality of clamping circuits, the output of said amplifying circuit being electrically connected to the inputs of said plurality of clamping circuits, all of said clamping circuits being responsive to the said recurrent pulse portion of said composite signal appearing in the output of said amplifying circuit, one of said clamping circuits being electrically connected to clamp the input of said amplifying circuit, each of the remainder of said clamping circuits being electrically connected to clamp the input of a particular one of said plurality of utilization circuits, respectively.

JOHN B. MAGGIO.

REFERENCES CITED

The following references are of record in the file of this patent:

UNITED STATES PATENTS

| Number | Name | Date |
|---|---|---|
| 2,284,085 | Collard | May 26, 1942 |
| 2,299,945 | Wendt | Oct. 27, 1942 |
| 2,445,040 | Schade | July 13, 1948 |
| 2,462,294 | Thompson | Feb. 22, 1949 |
| 2,474,580 | Hiehle | June 28, 1949 |

OTHER REFERENCES

Principles of Radar, M. I. T. Radar School Staff, 2nd ed., McGraw Hill Book Co., pages 3–66.